(12) United States Patent
Lin

(10) Patent No.: US 6,312,005 B1
(45) Date of Patent: Nov. 6, 2001

(54) STROLLER WITH THREE WHEELS

(76) Inventor: Wan-Hsing Lin, 58, Ma Yuan West St., Taichung (TW)

(*) Notice: Subject to any disclaimer, the term of this patent is extended or adjusted under 35 U.S.C. 154(b) by 0 days.

(21) Appl. No.: 09/584,172

(22) Filed: May 23, 2000

(51) Int. Cl.[7] .............................. B62B 7/08; F16D 1/104
(52) U.S. Cl. ..................... 280/647; 280/642; 280/650; 280/62; 16/900; 16/429; 16/405; 403/93
(58) Field of Search ........................... 280/642, 647, 280/650, 655, 47.38, 62, 47.371; 16/324, 326, 900, 429, 405; 403/93, 92, 101

(56) References Cited

U.S. PATENT DOCUMENTS

| | | | |
|---|---|---|---|
| 4,848,787 | * 7/1989 | Kassai | 280/642 |
| 5,362,089 | * 11/1994 | Jyan-Tsai | 280/642 |
| 5,364,119 | * 11/1994 | Leu | 280/642 |
| 5,460,398 | * 10/1995 | Huang | 280/642 |
| 5,513,864 | * 5/1996 | Huang | 280/47.36 |
| 5,605,409 | * 2/1997 | Haut et al. | 280/650 |
| 5,645,293 | * 7/1997 | Cheng | 280/642 |
| 5,695,212 | * 12/1997 | Hinkston | 280/642 |
| 5,755,455 | * 5/1998 | Chen et al. | 280/642 |
| 5,765,855 | * 6/1998 | Chiu | 280/642 |
| 5,826,564 | * 10/1998 | Kettler | 280/642 |
| 5,887,889 | * 3/1999 | Andrus | 280/647 |
| 5,938,229 | * 8/1999 | Chen et al. | 280/642 |
| 5,979,928 | * 11/1999 | Kuo | 280/642 |
| 6,062,587 | * 5/2000 | Cabagnero | 280/642 |
| 6,073,957 | * 6/2000 | Lan | 280/642 |
| 6,105,998 | * 8/2000 | Baechler et al. | 280/650 |
| 6,152,477 | * 11/2000 | Hsin et al. | 280/642 |
| 6,155,740 | * 12/2000 | Hatenstine | 280/642 |
| 6,241,274 | * 6/2001 | Huang | 280/642 |

* cited by examiner

*Primary Examiner*—Michael Mar
*Assistant Examiner*—Jeff J. Restifo (57) ABSTRACT

A stroller with three wheels includes a support frame, and a linking device. The support frame includes two front support stands, two rear support stands, and a U-shaped push handle having two lower ends each provided with a connecting rod. The linking device includes a support base secured on each of the two front support stands, and defining a chamber for receiving the front support stand, and a chamber for receiving the lower end of the push handle; a pivot member extending through a hole defined in the support base and through the connecting rod of the push handle so that the connecting rod of the push handle is pivoted on the support base; a first locking member pivotally mounted on the support base and having a first end secured on each of the two rear support stands so that each of the two rear support stands is pivoted with the first locking member, and a second end secured on the lower end of the push handle, a locking recess defined in the first locking member; and a second locking member movably mounted on the push handle and including a block having a lower end provided with a locking head detachably received in the locking recess of the first locking member.

15 Claims, 7 Drawing Sheets

STROLLER WITH THREE WHEELS

BACKGROUND OF THE INVENTION

1. Field of the Invention

The present invention relates to a stroller with three wheels.

2. Description of the Related Art

A conventional stroller having three wheels in accordance with the prior art comprises two front support stands, two rear support stands attached to the front support stands, a substantially U-shaped push handle mounted between the front support stands and the rear support stands, a front wheel rotatably mounted on the lower end of each of the two front support stands, two crossbars mounted between the two front support stands and the two rear support stands, two rear wheel support bars each mounted on each of the two rear support stands, and two rear wheels each rotatably mounted on the lower end of each of the two rear wheel support bars.

However, it is not easy to fold the frame of the stroller, thereby causing inconvenience to the user when folding the stroller. In addition, the stroller cannot provide a shock absorbing function so that the baby placed in the stroller easily feels uncomfortable when the stroller is moved on a rugged road, thereby decreasing the versatility of the stroller.

SUMMARY OF THE INVENTION

In accordance with one aspect of the present invention, there is provided a stroller with three wheels comprising: a support frame including two front support stands, two rear support stands, and a substantially U-shaped push handle having two lower ends each provided with a connecting rod; and a linking device mounted between the two front support stands, the two rear support stands, and the push handle.

The linking device includes a support base secured on each of the two front support stands, and defining a first chamber for receiving an upper end of each of the two front support stands, a second chamber provided with a saddle, and a third chamber for receiving the lower end of the push handle; a pivot member extending through a hole defined in the support base and through the connecting rod of the push handle so that the connecting rod of the push handle is pivoted on the support base; a first locking member pivotally received in the second chamber and having a first end secured on an upper end of each of the two rear support stands so that each of the two rear support stands is pivoted with the first locking member, and a second end secured on the lower end of the push handle, a locking recess defined in a top portion of the first locking member; and a second locking member movably mounted on the push handle and including a block extending outward. The block has a lower end provided with a locking head detachably received in the locking recess of the first locking member.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–4, a stroller with three wheels in accordance with the present invention comprises a support frame 5 including two front support stands 51, two rear support stands 52, and a substantially U-shaped push handle 54 having two lower ends each provided with a connecting rod 541; and a linking device 7 mounted between the two front support stands 51, the two rear support stands 52, and the push handle 54.

The support frame 5 further includes a footrest 511 secured on the two front support stands 51, a front wheel 512 rotatably mounted on the lower end of each of the two front support stands 51, two crossbars 53 mounted between the two front support stands 51 and the two rear support stands 52, two rear wheel support bars 521 each pivotally mounted on each of the two rear support stands 52, and two rear wheels 522 each rotatably mounted on the lower end of each of the two rear wheel support bars 521.

The stroller further comprises a shock absorbing device 6 including a biasing member 61 pressed between each of the two rear support stands 52 and each of the two rear wheel support bars 521, and two retaining pins 62 each having a first end secured to the biasing member 61 and a second end secured to each of the rear support stand 52 and the rear wheel support bar 521.

The linking device 7 includes a support base 71 secured on each of the two front support stands 51, and defining a first chamber 711 for receiving an upper end of each of the two front support stands 51, a second chamber 712 provided with a saddle 7121, and a third chamber 713 for receiving the lower end of the push handle 54; a pivot member 9 extending through a hole 7131 defined in the support base 71 and through the connecting rod 541 of the push handle 54 so that the connecting rod 541 of the push handle 54 is pivoted on the support base 71; a first locking member 72 pivotally received in the second chamber 712 and having a first end 721 secured on an upper end of each of the two rear support stands 52 so that each of the two rear support stands 52 is pivoted with the first locking member 72, and a second end secured on the lower end of the push handle 54, a locking recess 722 defined in a top portion of the first locking member 72; and a second locking member 74 movably mounted on the push handle 54 and including a block 743 extending outward that has a lower end provided with a locking head 7431 detachably received in the locking recess 722 of the first locking member 72.

Figure 2:
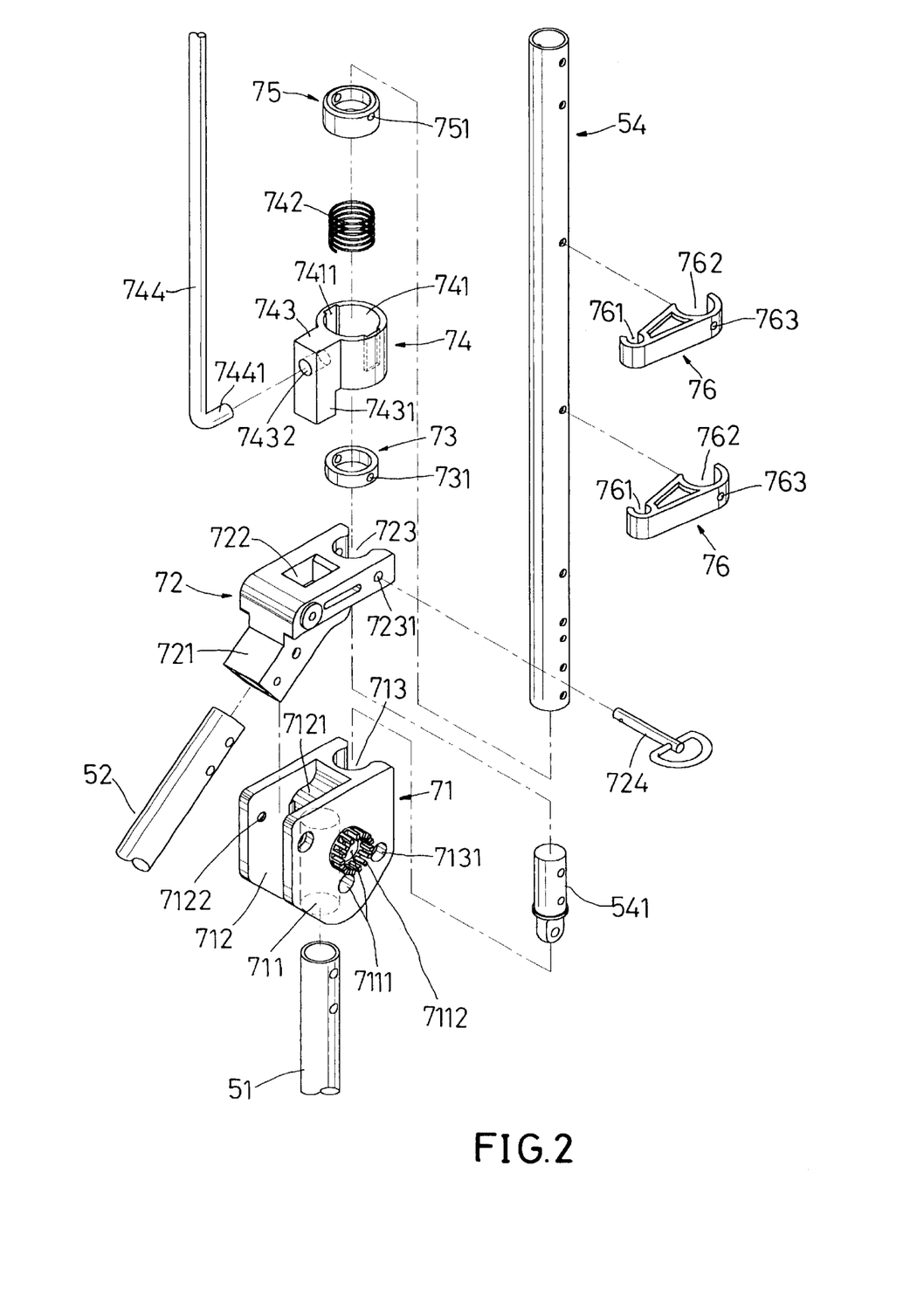
FIG. 2 is a partially exploded view of the linking device of the stroller as shown in FIG. 1.
Figure 3:
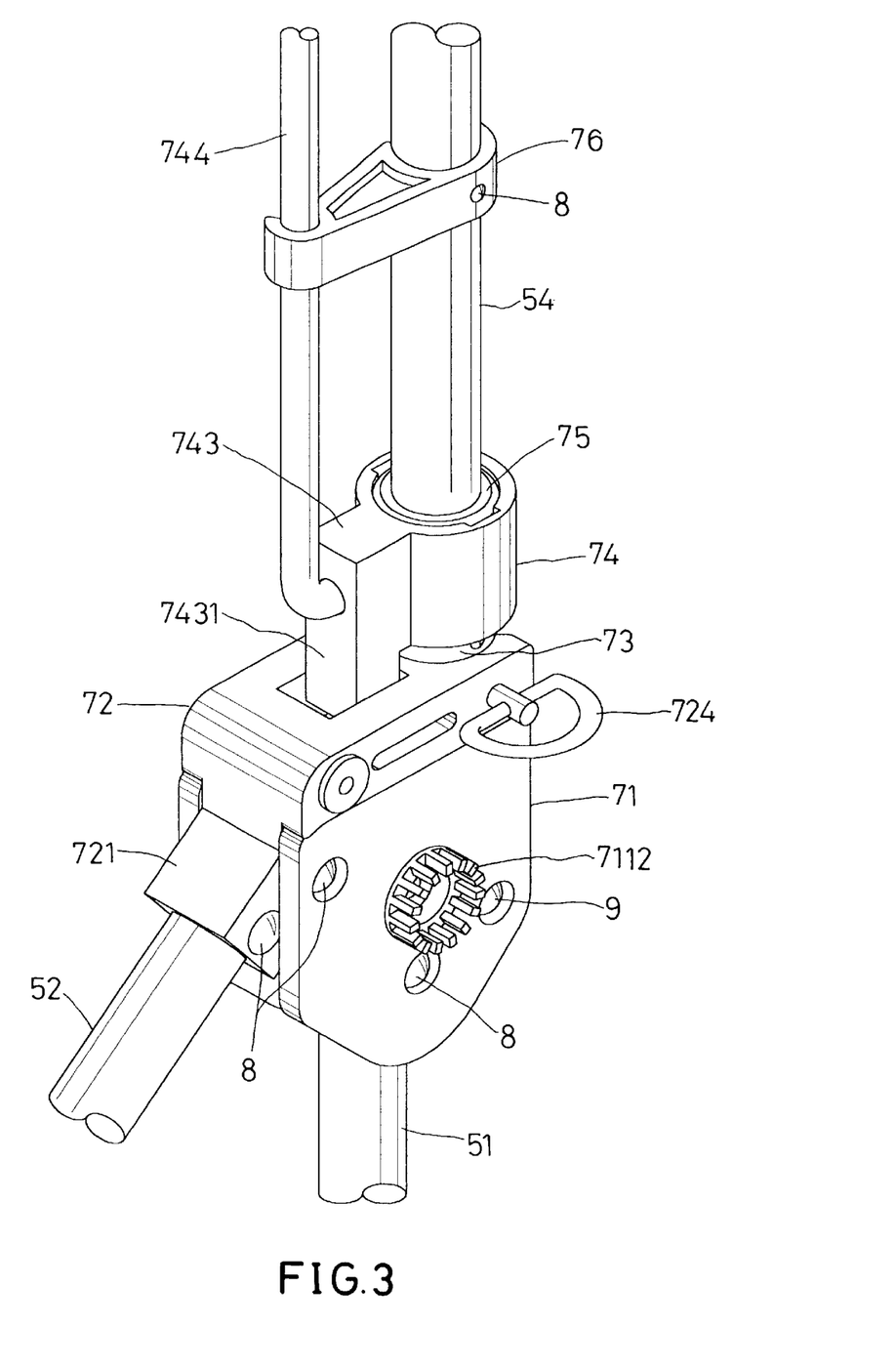
FIG. 3 is a perspective assembly view of the linking device of the stroller as shown in FIG. 2.
Figure 4:
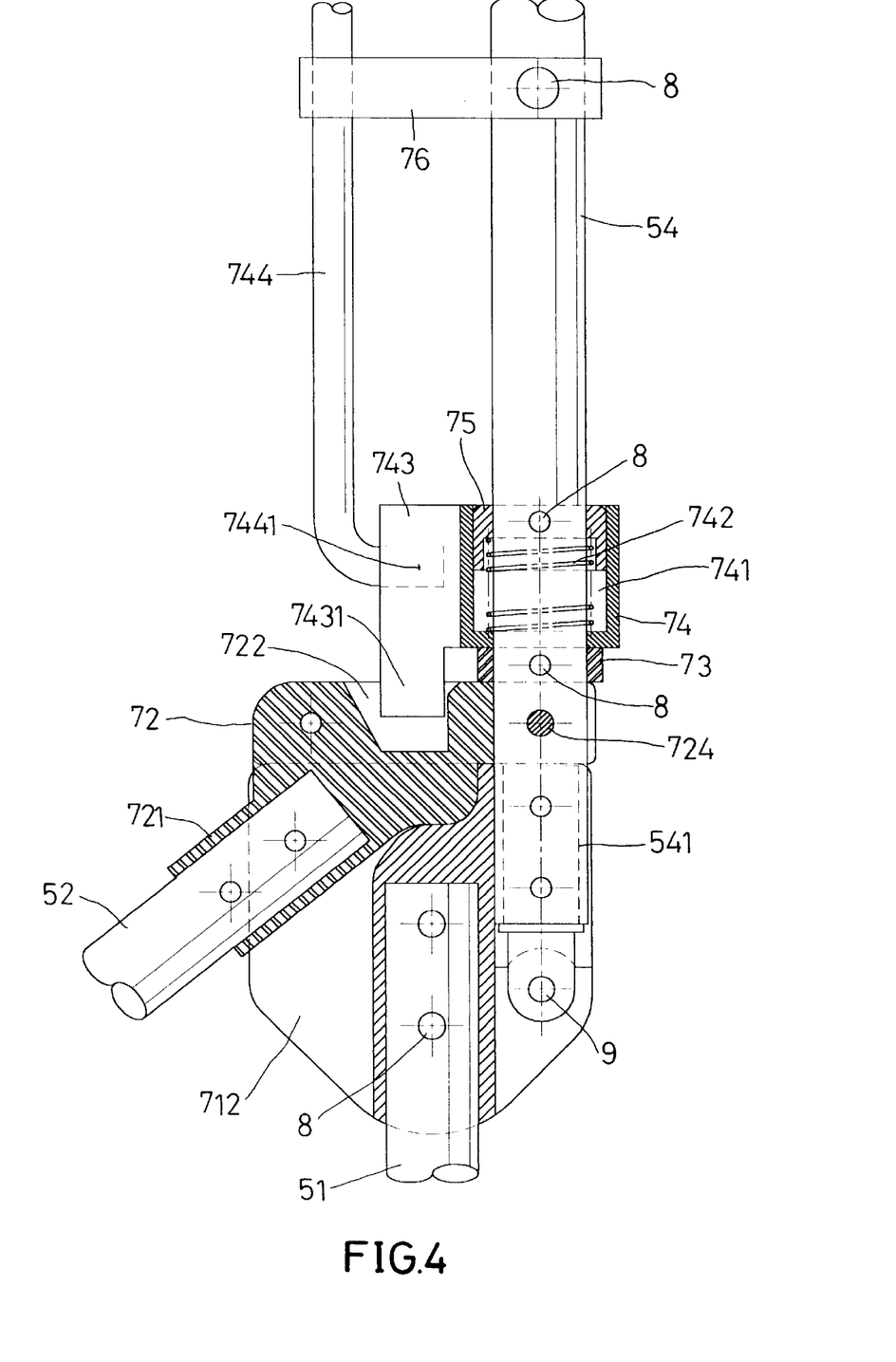
FIG. 4 is a front plan cross-sectional view of the stroller as shown in FIG. 3.

The support base 71 of the linking device 7 defines a hole 7111 and includes a plurality of elongated ribs 7112 extending outward therefrom, and the linking device 7 further comprises a securing member 8 extending through the hole 7111 and through the upper end of each of the two front support stands 51, thereby securing each of the two front support stands 51 to the support base 71.

The support base 71 of the linking device 7 also defines a through hole 7122, and the linking device 7 further comprises a securing member 8 extending through the through hole 7122 and through the first locking member 72 so that the first locking member 72 is pivoted on the support base 71.

The linking device 7 further includes a securing member 8 extending through the first end 721 of the first locking member 72 and through the upper end of each of the two rear support stands 52, thereby securing each of the two rear support stands 52 to the first locking member 72.

The second end of the first locking member 72 defines an opening 723 for receiving the push handle 54, and a through hole 7231 connecting to the opening 723, and the linking device 7 also comprises a pin 724 extending through the through hole 7231 and detachably extending through the push handle 54, thereby detachably securing the second end of the first locking member 72 to the push handle 54.

The linking device 7 further includes an abutting ring 73 secured on the push handle 54 and detachably abutting the second end of the first locking member 72, a through hole 731 defined in the abutting ring 73, and a securing member 8 extending through the through hole 731 of the abutting ring 73 and through the push handle 54, thereby securing the abutting ring 73 to the push handle 54.

The linking device 7 further includes a limiting ring 75 secured on the push handle 54 and received in a chamber 741 defined in the second locking member 74, and a biasing member 742 received in the chamber 741 of the second locking member 74 and pressed between the limiting ring 75 and the wall of the chamber 741.

The linking device 7 further includes a securing member 8 extending through a through hole 751 defined in the limiting ring 75 and through the push handle 54, thereby securing the limiting ring 75 to the push handle 54.

The chamber 741 of the second locking member 74 defines a slot 7411 for receiving the securing member 8, thereby facilitating the second locking member 74 moving on the limiting ring 75. In such a manner, the second locking member 74 is movable on the limiting ring 75, and is limited by the abutting ring 73.

The linking device 7 further includes a substantially U-shaped pull handle 744 having two lower ends each provided with a bent hook 7441 secured in a circular hole 7432 defined in the block 743 of the second locking member 74 so that the second locking member 74 can be moved with the pull handle 744.

The linking device 7 further includes a plurality of support arms 76 each having a first end secured on the push handle 54 and a second end for supporting the pull handle 744. Each of the support arms 76 has a first arcuate recess 762 defined in the first end thereof for receiving the push handle 54, and a second arcuate recess 761 defined in the second end thereof for receiving the pull handle 744. The linking device 7 further includes a securing member 8 extending through a through hole 763 defined in the first end of the support arm 76 and through the push handle 54 for securing the support arm 76 to the push handle 54.

Figure 1:
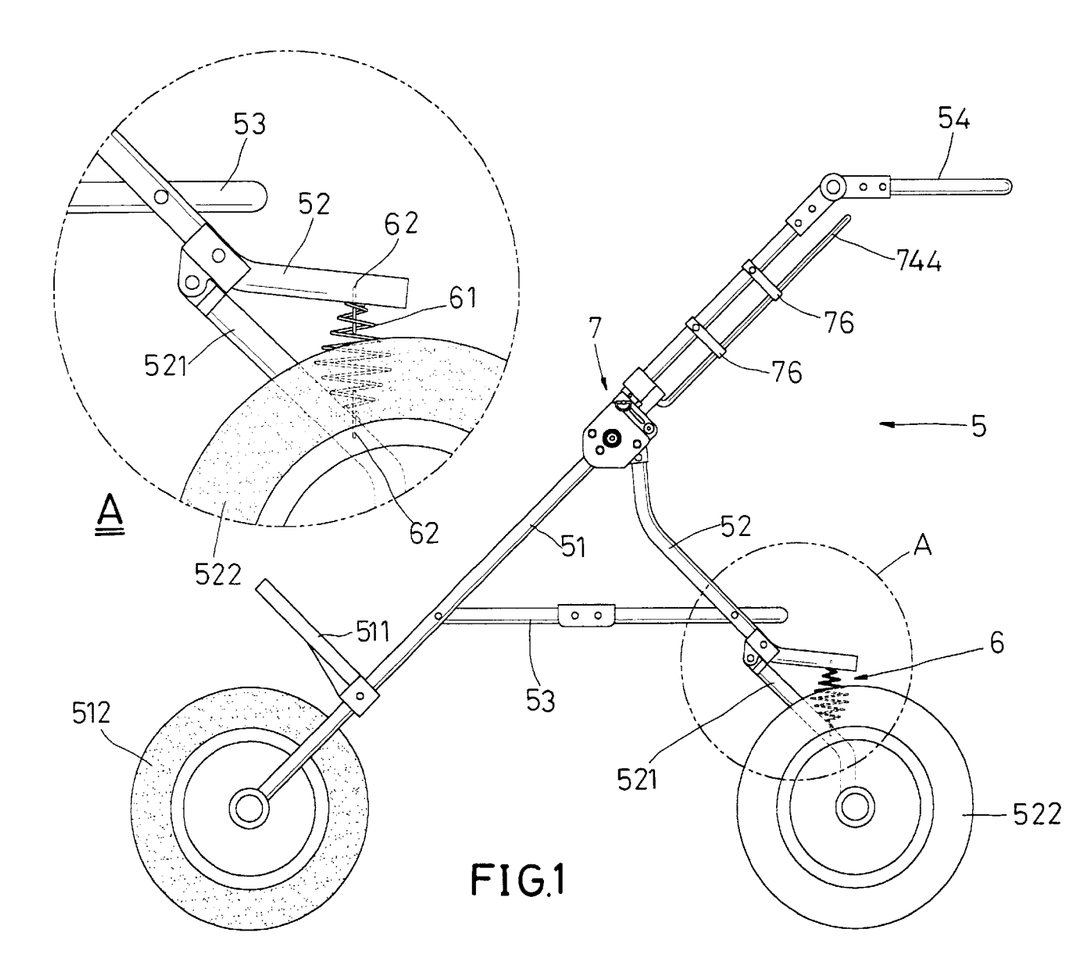
FIG. 1 is a front plan view of a stroller with three wheels in accordance with the present invention.

In operation, referring to FIGS. 4–7 with reference to FIGS. 1–3, the second locking member (74) is initially pressed by the biasing member 742 to move downward so that the locking head 7431 of the block 743 is received in the locking recess 722 of the first locking member 72 as shown in FIG. 4, thereby securing the push handle 54 is secured to the support base 71.

Figure 5:
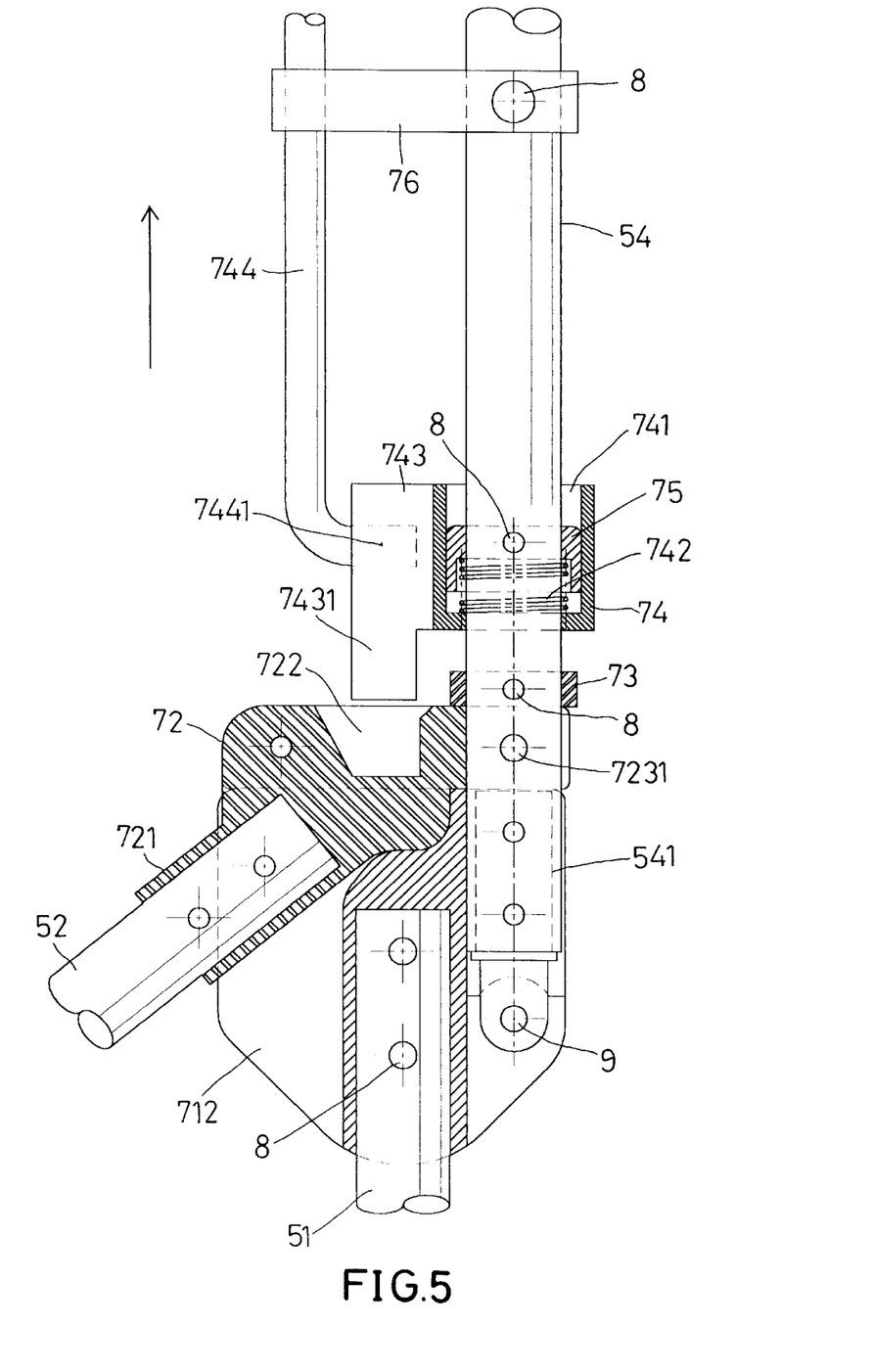
FIG. 5 is an operational view of the stroller as shown in FIG. 4.
Figure 6:
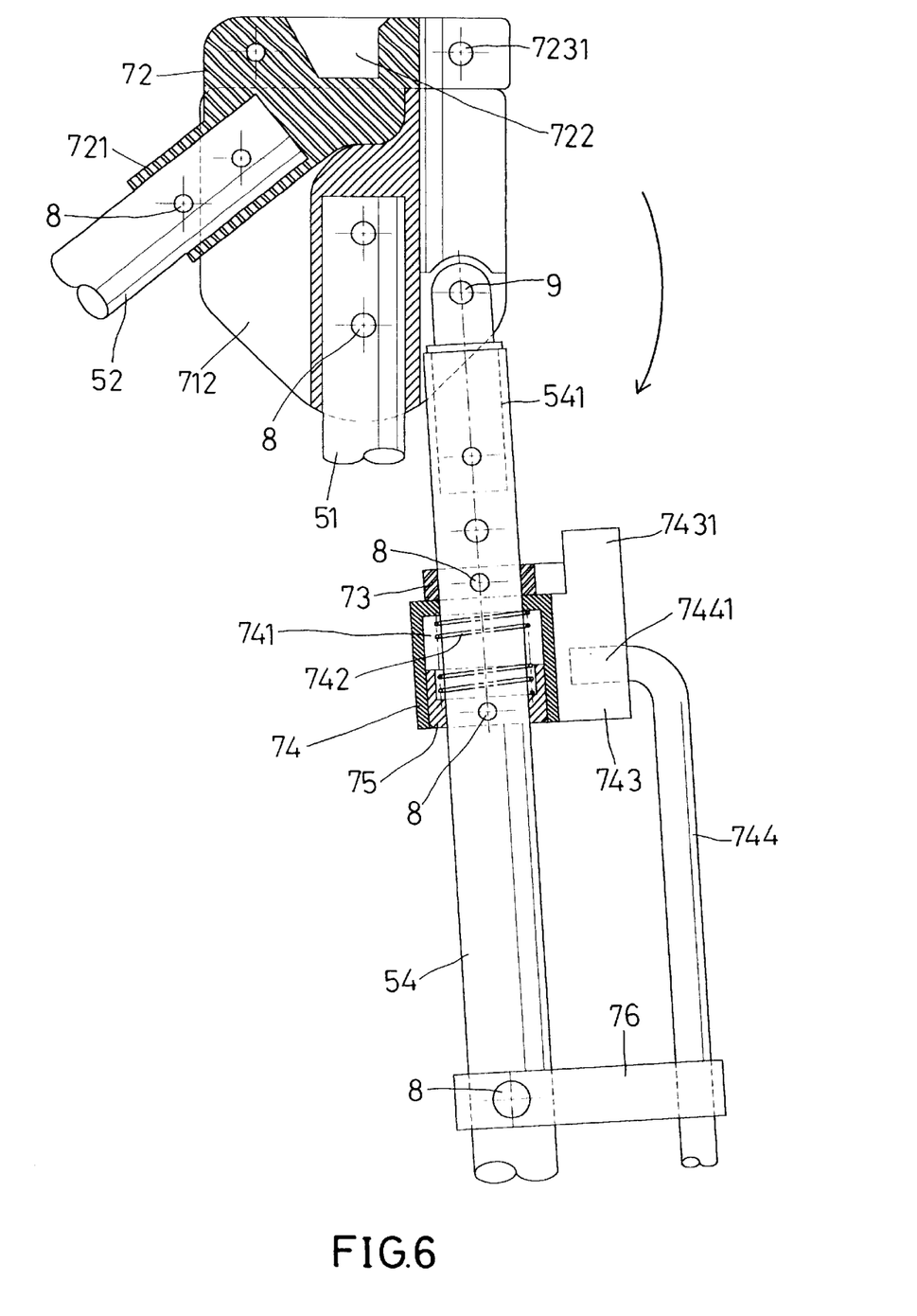
FIG. 6 is an operational view of the stroller as shown in FIG. 5.

When the user wishes to fold the stroller, the pull handle 744 is lifted to move the block 743 together with the locking head 7431 upward by the hook 7441 so that the second locking member 74 is moved upward from the position as shown in FIG. 4 to the position as shown in FIG. 5, thereby in turn detaching the locking head 7431 from the locking recess 722 so that the push handle 54 is pivoted relative to the support base 71 about the pivot member 9 so as to move from the position as shown in FIG. 5 to the position as shown in FIG. 6, thereby folding the push handle 54 to the front support stands 51.

Figure 7:
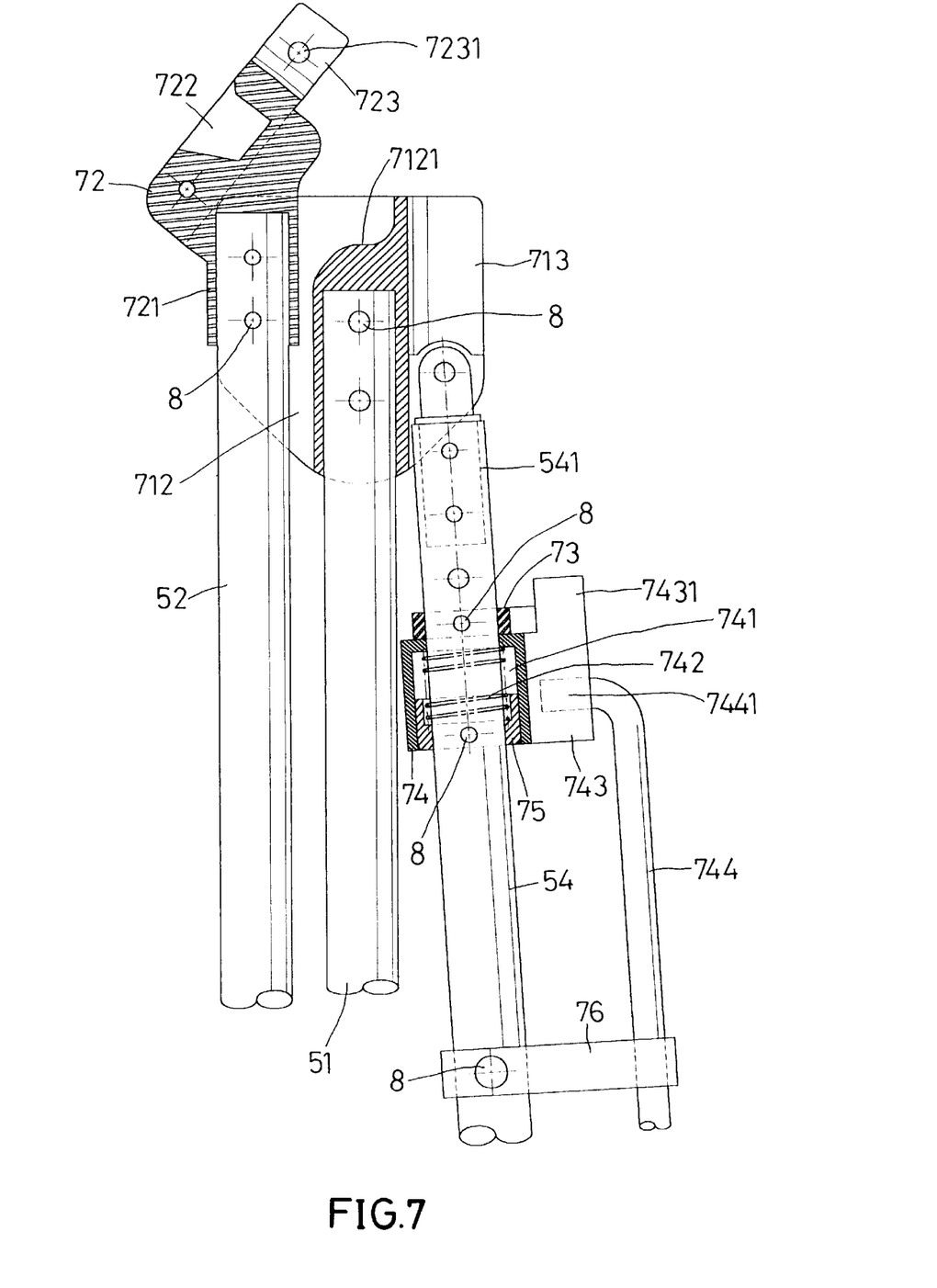
FIG. 7 is an operational view of the stroller as shown in FIG. 6.

At the same time, the first locking member 72 together with the rear support stands 52 can be pivoted relative to the support base 71 about the securing member 8 so as to move from the position as shown in FIG. 6 to the position as shown in FIG. 7, thereby folding the rear support stands 52 to the front support stands 51, and thereby finally folding the whole stroller.

Accordingly, the folding action of the stroller can be controlled easily by means of pulling the pull handle 744, thereby facilitating the user folding the stroller. In addition, the shock absorbing device 6 can be used to provide a shock absorbing function, thereby enhancing the comfort of the stroller. Further, the first locking member 72 and the second locking member 74 are locked rigidly, thereby efficiently securing the push handle 54. Further, the abutting ring 73 can be used to rigidly fix the first locking member 72, thereby increasing the stability of the stroller.

It should be clear to those skilled in the art that further embodiments may be made without departing from the scope of the present invention.

What is claimed is:

1. A stroller with three wheels comprising:
   a support frame (5) including two front support stands (51), two rear support stands (52), and a substantially U-shaped push handle (54) having two lower ends each provided with a connecting rod (541); and
   a linking device (7) mounted between said two front support stands (51), said two rear support stands (52), and said push handle (54), and including:
     a support base (71) secured on each of said two front support stands (51), and defining a first chamber (711) for receiving an upper end of each of said two front support stands (51), a second chamber (712) provided with a saddle (7121), and a third chamber (713) for receiving said lower end of said push handle (54);
     a pivot member (9) extending through a hole (7131) defined in said support base (71) and through said connecting rod (541) of said push handle (54) so that said connecting rod (541) of said push handle (54) is pivoted on said support base (71);
     a first locking member (72) pivotally received in said second chamber (712) and having a first end (721) secured on an upper end of each of said two rear support stands (52) so that each of said two rear support stands (52) is pivoted with said first locking member (72), and a second end secured on said lower end of said push handle (54), a locking recess (722) defined in a top portion of said first locking member (72); and
     a second locking member (74) movably mounted on said push handle (54) and including a block (743) extending outward, said block (743) having a lower end provided with a locking head (7431) detachably received in said locking recess (722) of said first locking member (72).

2. The stroller in accordance with claim 1, wherein said support frame (5) further includes a footrest (511) secured on said two front support stands (51), a front wheel (512) rotatably mounted on the lower end of each of said two front support stands (51), two crossbars (53) mounted between said two front support stands (51) and said two rear support stands (52), two rear wheel support bars (521) each pivotally mounted on each of said two rear support stands (52), and two rear wheels (522) each rotatably mounted on the lower end of each of said two rear wheel support bars (521).

3. The stroller in accordance with claim 2, further comprising a shock absorbing device (6) including a biasing member (61) pressed between each of said two rear support stands (52) and each of said two rear wheel support bars (521), and two retaining pins (62) each having a first end secured to said biasing member (61) and a second end secured to each of said rear support stand (52) and said rear wheel support bar (521).

4. The stroller in accordance with claim 1, wherein said support base (71) of said linking device (7) defines a hole (7111) and includes a plurality of elongated ribs (7112) extending outward therefrom, and said linking device (7) further comprises a securing member (8) extending through said hole (7111) and through the upper end of each of said two front support stands (51), thereby securing each of said two front support stands (51) to said support base (71).

5. The stroller in accordance with claim 1, wherein said support base (71) of said linking device (7) defines a through hole (7122), and said linking device (7) further comprises a securing member (8) extending through said through hole (7122) and through said first locking member (72) so that said first locking member (72) is pivoted on said support base (71).

6. The stroller in accordance with claim 1, wherein said linking device (7) further includes a securing member (8) extending through said first end (721) of said first locking member (72) and through the upper end of each of said two rear support stands (52), thereby securing each of said two rear support stands (52) to said first locking member (72).

7. The stroller in accordance with claim 1, wherein said second end of said first locking member (72) defines an opening (723) for receiving said push handle (54), and a through hole (7231) connecting to said opening (723), and said linking device (7) further comprises a pin (724) extending through said through hole (7231) and detachably extending through said push handle (54), thereby detachably securing said second end of said first locking member (72) to said push handle (54).

8. The stroller in accordance with claim 1, wherein said linking device (7) further includes an abutting ring (73) secured on said push handle (54) and detachably abutting said second end of said first locking member (72), a through hole (731) defined in said abutting ring (73), and a securing member (8) extending through said through bole (731) of said abutting ring (73) and through said push handle (54), thereby securing said abutting ring (73) to said push handle (54).

9. The stroller in accordance with claim 1, wherein said linking device (7) further includes a limiting ring (75) secured on said push handle (54) and received in a chamber (741) defined in said second locking member (74), and a biasing member (742) received in said chamber (741) of said second locking member (74) and pressed between said limiting ring (75) and the wall of said chamber (741).

10. The stroller in accordance with claim 9, wherein said linking device (7) further includes a securing member (8) extending through a through hole (751) defined in said limiting ring (75) and through said push handle (54), thereby securing said limiting ring (75) to said push handle (54).

11. The stroller in accordance with claim 10, wherein said chamber (741) of said second locking member (74) defines a slot (7411) for receiving said securing member (8), thereby facilitating said second locking member (74) moving on said limiting ring (75).

12. The stroller in accordance with claim 1, wherein said linking device (7) further includes a substantially U-shaped pull handle (744) having two lower ends each provided with a bent hook (7441) secured in a circular hole (7432) defined in said block (743) of said second locking member (74) so that said second locking member (74) can be moved with said pull handle (744).

13. The stroller in accordance with claim 12, wherein said linking device (7) further includes a plurality of support arms (76) each having a first end secured on said push handle (54) and a second end for supporting said pull handle (744).

14. The stroller in accordance with claim 13, wherein each of said support arms (76) has a first arcuate recess (762) defined in the first end thereof for receiving said push handle (54), and a second arcuate recess (761) defined in the second end thereof for receiving said pull handle (744).

15. The stroller in accordance with claim 14, wherein said linking device (7) further includes a securing member (8) extending through a through hole (763) defined in the first end of said support arm (76) and through said push handle (54) for securing said support arm (76) to said push handle (54).

* * * * *